United States Patent
Igeta et al.

(10) Patent No.: US 7,523,210 B2
(45) Date of Patent: Apr. 21, 2009

(54) INFORMATION PROVIDING SERVER, COMMUNICATION TERMINAL, CONTROL METHOD THEREFOR, AND INFORMATION PROVIDING SYSTEM

(75) Inventors: Satoshi Igeta, Kanagawa (JP); Satoshi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 751 days.

(21) Appl. No.: 10/254,518

(22) Filed: Sep. 26, 2002

(65) Prior Publication Data
US 2003/0065798 A1 Apr. 3, 2003

(30) Foreign Application Priority Data
Sep. 28, 2001 (JP) .............................. 2001-300589

(51) Int. Cl.
*G06F 15/16* (2006.01)
*G06F 7/04* (2006.01)

(52) U.S. Cl. ............................ 709/229; 709/217; 726/7

(58) Field of Classification Search ................. 709/229, 709/217; 726/7
See application file for complete search history.

(56) References Cited

U.S. PATENT DOCUMENTS

| | | | | |
|---|---|---|---|---|
| 5,915,087 | A * | 6/1999 | Hammond et al. ............ | 726/12 |
| 6,070,246 | A * | 5/2000 | Beser ............................ | 726/2 |
| 6,085,249 | A * | 7/2000 | Wang et al. .................. | 709/229 |
| 6,170,061 | B1 * | 1/2001 | Beser ............................ | 726/3 |
| 6,216,151 | B1 * | 4/2001 | Antoun ........................ | 709/203 |
| 6,490,355 | B1 * | 12/2002 | Epstein ........................ | 380/203 |
| 6,718,328 | B1 * | 4/2004 | Norris ............................ | 707/9 |
| 2002/0032865 | A1 * | 3/2002 | Golubchik et al. .......... | 713/178 |
| 2002/0169961 | A1 * | 11/2002 | Giles et al. .................. | 713/175 |

FOREIGN PATENT DOCUMENTS

| | | |
|---|---|---|
| EP | 0 940 960 | 9/1999 |
| JP | 9-146824 | 6/1997 |
| JP | 11-031129 | 2/1999 |
| JP | 2000-57097 | 2/2000 |
| JP | 2000-7345 | 1/2002 |
| JP | 2002-140298 | 5/2002 |
| WO | WO 96/42041 | 12/1996 |

OTHER PUBLICATIONS

U.S. Appl. No. 10/254,516, filed Sep. 26, 2002.
U.S. Appl. No. 10/254,573, filed Sep. 26, 2002.
U.S. Appl. No. 10/254,526, filed Sep. 26, 2002.
U.S. Appl. No. 10/254,675, filed Sep. 26, 2002.
U.S. Appl. No. 10/254,570, filed Sep. 26, 2002.

* cited by examiner

*Primary Examiner*—William C Vaughn, Jr.
*Assistant Examiner*—Ranodhi N Serrao
(74) *Attorney, Agent, or Firm*—Fitzpatrick, Cella, Harper & Scinto

(57) ABSTRACT

This invention discloses a server apparatus which can prevent direct reference to information that should be referred to only after a predetermined procedure, and a control method for the apparatus. The server apparatus of this invention analyzes address information contained in an information reference request and checks whether the address information contains system time added by the information server. If the system time is contained, it is compared with the current system time. Only when the difference between them has a predetermined value or less, the address information is determined as valid.

7 Claims, 7 Drawing Sheets

FIG. 4

USER REGISTRATION WINDOW

E-MAIL ADDRESS:

Login Name:

PASSWORD:

NAME
- LAST NAME:     FIRST NAME:
- PHONETIC TRANSCRIPTIONS IN KANA:     FIRST NAME:

ADDRESS
- 〒:  -     MUNICIPAL DIVISION:
- CITY/DISTRICT/TOWN/VILLAGE NAME, TOWN NAME/STREET NUMBER, etc.:
- APARTMENT/CONDOMINIUM NAME, ROOM NUMBER, etc.:

TELEPHONE NUMBER
 -  -

REGISTER    CANCEL

FIG. 5

INVALID ACCESS. YOU CANNOT REFER TO THIS
INFORMATION BY ADDRESS DESIGNATED.

OK

INFORMATION PROVIDING SERVER, COMMUNICATION TERMINAL, CONTROL METHOD THEREFOR, AND INFORMATION PROVIDING SYSTEM

FIELD OF THE INVENTION

The present invention relates to an information providing server which provides a reference service of information designated by a user, and a control method for the server and, more particularly, to an information providing server which validates reference of information in accordance with only a specific procedure, and a control method for the server.

The present invention also relates to a communication terminal which is used when a user uses such an information providing server, and a control method for the terminal.

The present invention further relates to an information providing system having such an information providing server and/or a communication terminal.

BACKGROUND OF THE INVENTION

Recently, with improvements in communication environments and advances in information communication techniques, service sites for providing information and/or services have been realized by using computer networks, e.g., the Internet.

Such service sites include sites for providing services to users under the condition that the users should refer to specific information such as advertisement information or access the sites using specific applications. That is, there are service sites designed to permit reference of information desired by users only after they satisfy specific procedures.

To use a service site on a computer network such as the Internet, generally, communication with a server apparatus that constructs the service site is executed using Web browser software (browser) in accordance with a protocol such as HTTP (HyperText Transfer Protocol), and the browser interprets and displays information described in a language such as HTML or XML, which is transmitted from the server apparatus whereby the user refers to the information in the service site.

Address information, e.g., URL (Uniform Resource Locator) corresponding to information that is currently being displayed is displayed on the browser. Hence, the user can register in the browser address information corresponding to information the user has finally referred to as a bookmark or make a note of the address information. If the user wants to refer to the information again, he/she can directly refer to it by directly designating the stored address information, although that information should not be referred to without predetermined operation.

To solve this problem, reference of information wanted by a user may be inhibited unless he/she acquires authentication information such as a session key by accessing the site using a predetermined URL such as a URL corresponding to the initial window of the site. In this method, however, the authentication information must be changed for every session. In addition, since session management is necessary, the load on the server apparatus increases.

SUMMARY OF THE INVENTION

The present invention has been made in consideration of such a problem in the conventional technique, and has as its object to provide a server apparatus which can prevent direct reference to information that should be referred to only after a predetermined procedure, and a control method for the apparatus.

It is another object of the present invention to provide a communication terminal which can communicate with an information providing server according to the present invention, and a control method for the terminal.

It is still another object to provide an information providing an information providing system using the information providing server and/or the communication terminal according to the present invention.

In order to achieve the above object, according to an aspect of the present invention, an information providing server which transmits predetermined information in response to an information reference request received through a network, is characterized by comprising: storage means for storing the predetermined information to be transmitted; analysis means for acquiring first address information which is contained in the information reference request and specifies information requested by the information reference request; and address determination means for executing processing according to the first address information, wherein when the first address information is second address information returned from the information providing server to a transmission source of the information reference request, the address determination means determines validity of the second address information, and if the second address information is valid, the address determination means reads out information designated by the second address information from the storage means and returns the readout information to the transmission source of the information reference request.

In order to achieve the above object, according to another aspect of the present invention, a control method for an information providing server which comprises storage means for storing predetermined information and transmits the predetermined information in response to an information reference request received through a network, is characterized by comprising: the analysis step of acquiring first address information which is contained in the information reference request and specifies information requested by the information reference request; and the address determination step of executing processing according to the first address information, wherein in the address determination step, when the first address information is second address information returned from the information providing server to a transmission source of the information reference request, validity of the second address information is determined, and if the second address information is valid, information designated by the second address information is read out from the storage means and returned to the transmission source of the information reference request.

In order to achieve the above object, according to further aspect of the present invention, a control method for a communication terminal which can use an information providing server, is characterized by comprising: the access step of accessing the information providing server without disclosing address information necessary for first access to the information providing server to a user of the communication terminal.

In order to achieve the above object, according to still further aspect of the present invention, a computer program for causing a computer apparatus to function as an information providing server which transmits predetermined information in response to an information reference request received through a network, is characterized by comprising: storage means for storing the predetermined information to be transmitted; analysis means for acquiring first address information which is contained in the information reference request and specifies information requested by the information reference request; and address determination means for executing processing according to the first address information, wherein when the first address information is second address information returned from the information providing server to a transmission source of the information reference request, the address determination means determines validity of the second address information, and if the second address information is valid, the address determination means reads out information designated by the second address information from the storage means and returns the readout information to the transmission source of the information reference request.

In order to achieve the above object, according to further aspect of the present invention, a computer program for causing a computer apparatus to function as a communication terminal which can use an information providing server, is characterized by comprising: access means for accessing the information providing server without disclosing address information necessary for first access to the information providing server to a user of the communication terminal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, server to explain the principles of the invention.

FIG. 4 is a view showing an example of the window transmitted from the information providing server according to the embodiment of the present invention in response to an information reference request having a valid access address;

FIG. 5 is a view showing an example of the window transmitted from the information providing server according to the embodiment of the present invention in response to an information reference request having an invalid access address;

DETAILED DESCRIPTION OF THE PREFERRED EMBODIMENT

A preferred embodiment of the present invention will now be described in detail in accordance with the accompanying drawings.

(Overall Arrangement)

Figure 1:
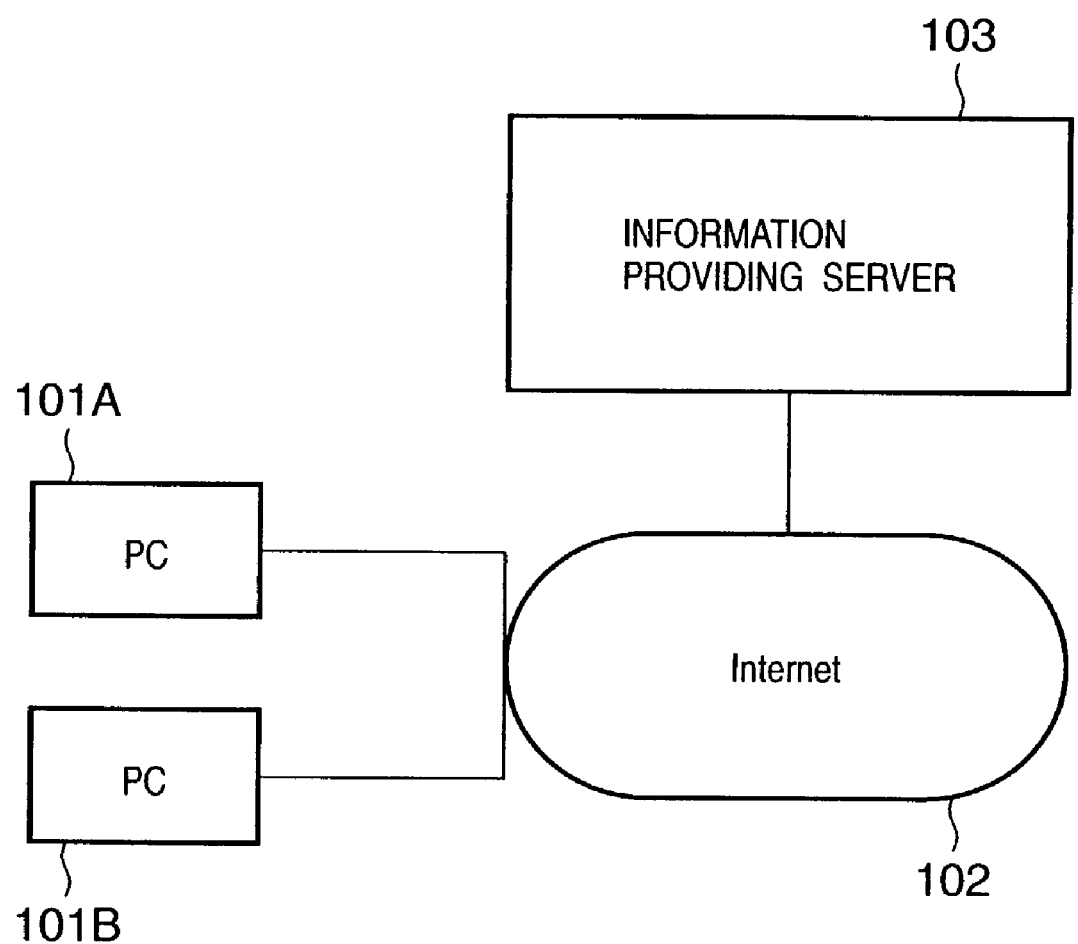
FIG. 1 is a block diagram showing an example of the overall arrangement of an information providing system using an information providing server according to an embodiment of the present invention.

FIG. 1 is a block diagram showing an example of the overall arrangement of an information providing system using an information providing server according to this embodiment.

Referring to FIG. 1, reference numerals 101A and 101B denote computer devices such as personal computers (to be referred to as user PCs hereinafter) used by users of the information providing system in FIG. 1. These user PCs function as communication terminals according to the present invention which can communicate with the information providing server to be described later. A user PC 101 is connected to the Internet 102 as a computer network.

On the user PC 101, a browser accesses a server apparatus (information providing server) 103 which forms an information provision site by using a standard protocol such as HTTP (HyperText Transfer Protocol), loads/analyzes a file created by a description language such as HTML (HyperText Markup Language) or XML (Extensible Markup Language) and managed by the information providing server 103, and further loads linked multimedia information such as image information and sound information, thereby displaying a Web page. With this operation, the user PC 101A (its user) can receive the service provided by the information providing server 103 through the Internet 102.

The user of the user PC 101 then transmits an information reference request (browse request) to the information providing server 103 through the browser. The information providing server 103 reads out information stored in advance in accordance with the reference request and transmits the information to the user PC 101. Pieces of information that can be provided are stored in the information providing server 103 in correspondence with pieces of address information, e.g., URLs, which can directly be specified from the user PC 101. In this manner, the user of the user PC 101 can browse the designated information through the browser.

(Arrangements of Information Providing Server 103 and User PC 101)

In this embodiment, the information providing server 103 and user PC 101 can be realized by general-purpose computers such as personal computers which can be connected to a computer network.

Figure 2:
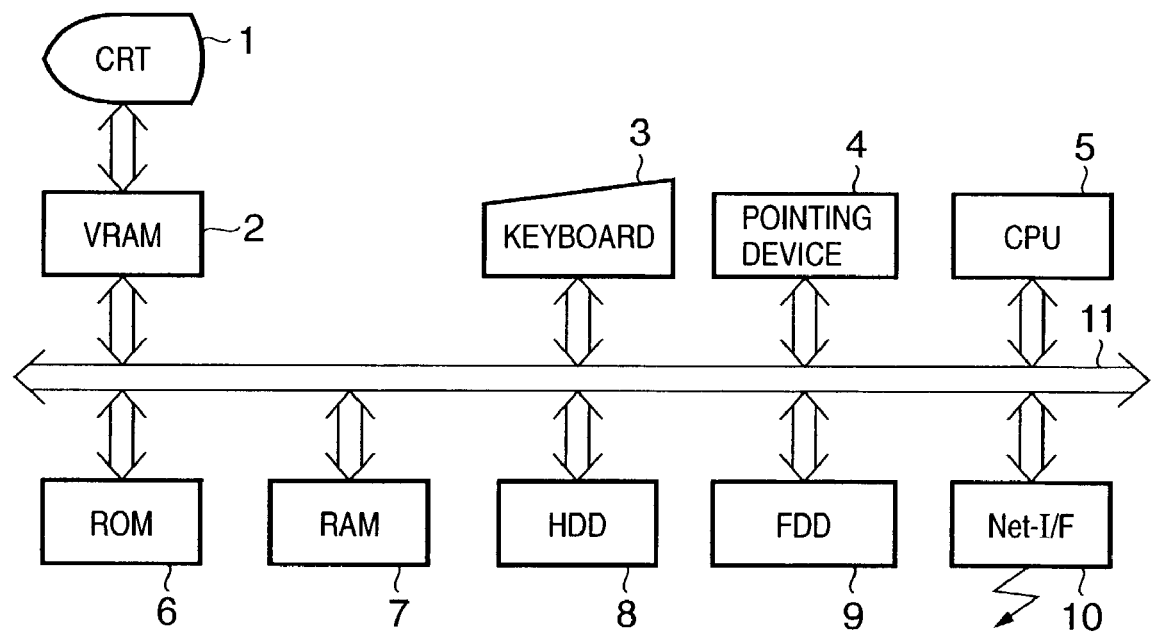
FIG. 2 is a block diagram showing an example of the arrangement of a computer apparatus which can be used as an information providing server or user PC according to an embodiment of the present invention.

FIG. 2 is a block diagram showing an example of the arrangement of a computer apparatus that can be used as the information providing server 103 or user PC 101 in this embodiment.

Referring to FIG. 2, reference numeral 1 denotes a CRT (Cathode Ray Tube) which displays the data that is being processed by an application program, various message menus, and the like; 2, a video RAM (to be referred to as a VRAM hereinafter) which bitmaps an image to be displayed on the screen of the CRT 1; 3 and 4, a keyboard and a pointing device, respectively, which are used to input characters and the like in predetermined columns on the screen and indicate icons, buttons, and the like on a GUI (Graphic User Interface); and 5, a CPU (Central Processing Unit) which performs overall control.

Reference numeral 6 denotes a ROM (Read Only Memory) in which the operation procedures (programs) executed by the CPU 5 are stored. Note that programs associated with the flow charts to be described later, including application programs associated with data processing and error processing programs, are also stored in the ROM 6. Reference numeral 7 denotes a RAM (Random Access Memory) which is used as a work area when the CPU 5 executes the various programs described above and a save area for error processing.

Reference numeral 8 denotes a hard disk drive (to be referred to as an HDD hereinafter); and 9, a floppy disk drive (to be referred to as an FDD hereinafter). These disk drives are used as storage areas for an OS, application programs such as a browser, data, libraries, and the like. In place of the FDD or in addition thereto, an optical (magnetic) disk drive such as a CD-ROM, MO, or DVD, a magnetic tape drive such as a tape streamer or DDS, or the like may be used.

Reference numeral 10 denotes a network interface which is used to connect the apparatus to the network; and 11, an I/O bus (constituted by an address bus, data bus, and control bus) which connects the above units to each other.

Such a general-purpose computer apparatus is connected to the Internet 102 through a necessary network device (not shown) such as a modem or router, another computer apparatus, or the like, as needed.

In the information providing server 103 according to this embodiment, various kinds of information to be transmitted to the user PC 101 can be stored in a predetermined area in the HDD 8 in FIG. 2 (or an independent HDD). Each process to be described below can be implemented by making the CPU 5 execute a program stored in a predetermined area of the ROM 6 or HDD 8 and control necessary constituent elements.

As examples of information providing services realized by the above system, services in the following cases will be mainly described in detail in this embodiment:

(1) reference of information according to predetermined procedure: making the user PC 101A refer to information using a browser through an application (in this specification, an application program other than a browser application);

(2) reference of information without using predetermined procedure: making the user PC 101B directly designate, on a browser, the address of information to be referred to and refer to the information.

Each of the above services will be described in detail later. Obviously, the services and functions realized by the information providing system of this embodiment are not limited to those described above.

(Outline of Processing for Information Reference Request)

Figure 3:
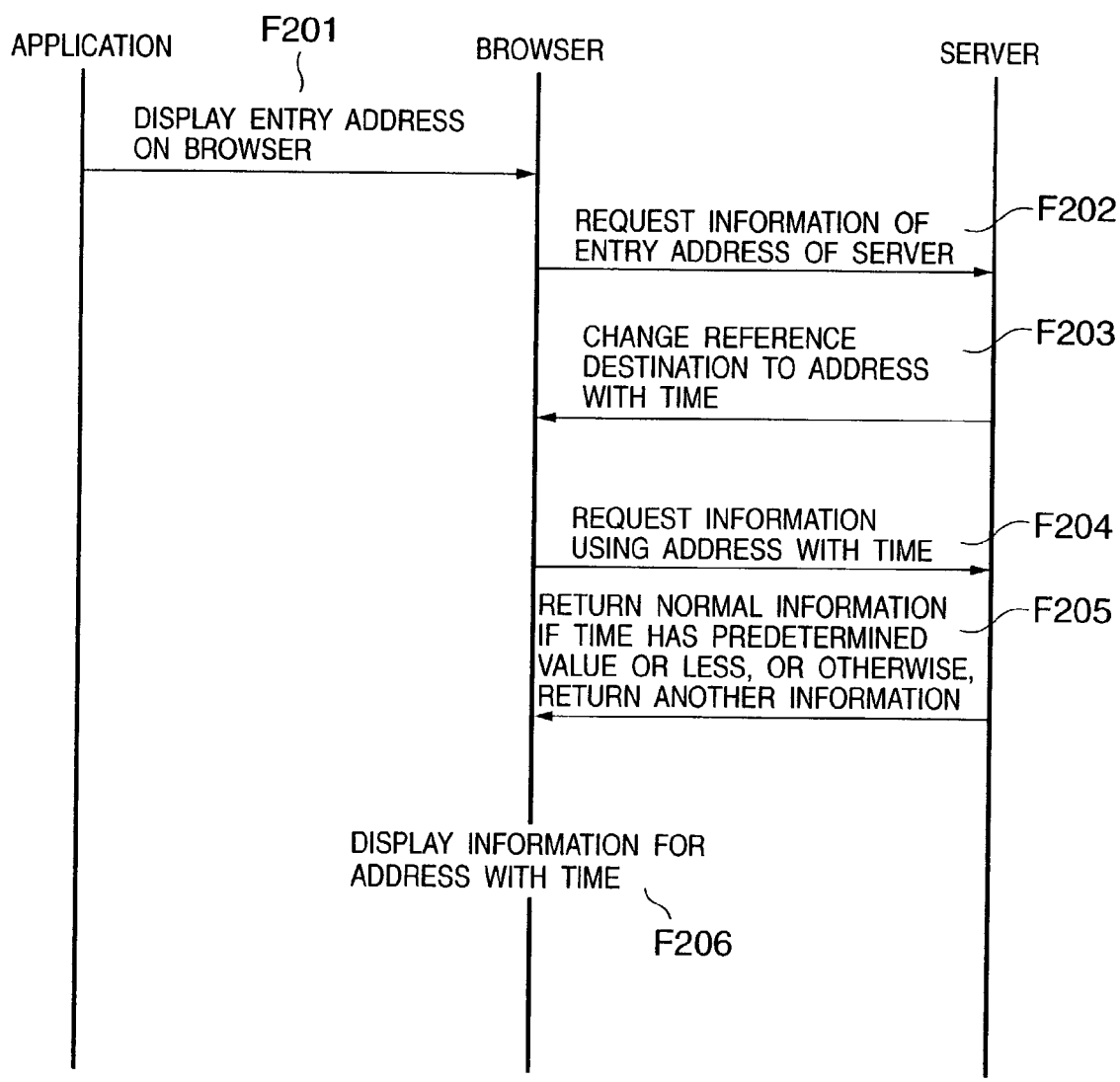
FIG. 3 is a sequence chart showing an outline of processing executed in response to an information reference request from a user in the information providing system according to the embodiment.

FIG. 3 is a sequence chart for explaining processing executed between an application installed in the user PC 101 in advance and a browser and information providing server 103, which operate on the user PC 101, to refer to information in the information providing server 103 from the user PC 101 in the information providing system according to this embodiment.

In this embodiment, a case wherein the browser is caused to access address information (entry address) corresponding to the initial window of the information providing server 103 when a predetermined application is executed. With this arrangement, access to the information providing server 103 can be executed while leaving the user uninformed about the entry address.

However, if the user may know the entry address, any other arbitrary method can be used. For example, the user may be caused to directly input the entry address to the browser. Alternatively, the entry address of the information providing server 103, which is registered in the browser as a bookmark, may be used.

In F201, the application on the user PC 101A requests the browser on the user PC 101A to refer to the entry address implemented in the application. Browser control by the application can be done using a known inter-application communication technique.

In F202, the browser transmits the information reference request for that entry address to the information providing server 103 through the Internet 102. Note that the browser and a server application that runs on the information providing server 103 communicate with each other in accordance with a standard protocol such as HTTP, as described above.

In F203, the information providing server 103 generates an access address having server time in response to the information reference request from the browser, and notifies the browser that it should send an information reference request again using the access address. The access address generation processing executed by the information providing server 103 in F203 will be described later in detail with reference to FIG. 6. Note that the server time is time managed in the information providing server 103.

In F204, the browser transmits an information reference request to the information providing server 103 through the Internet 102 using the access address received from the information providing server 103 in F203.

In F205, the information providing server 103 checks the access address contained in the information reference request received from the browser. If the difference between the server time contained in the access address and the server time when that access address is received has a predetermined value or less, the information providing server 103 transmits information requested by the access address (i.e., initial window display data that is information corresponding to the entry address of the information providing server 103). Otherwise, the information providing server 103 transmits another information to the browser through the Internet 102. The address determination processing executed by the information providing server 103 in F205 will be described later in detail with reference to FIG. 7.

In F206, the browser displays the information transmitted from the information providing server 103 in F205. FIG. 4 shows an example of the initial window transmitted to the browser when the information providing server 103 has determined that the access address is valid.

FIG. 5 shows an example of the error window transmitted to the browser when the information providing server 103 has determined that the access address is invalid.

(Access Address Generation Processing)

Figure 6:
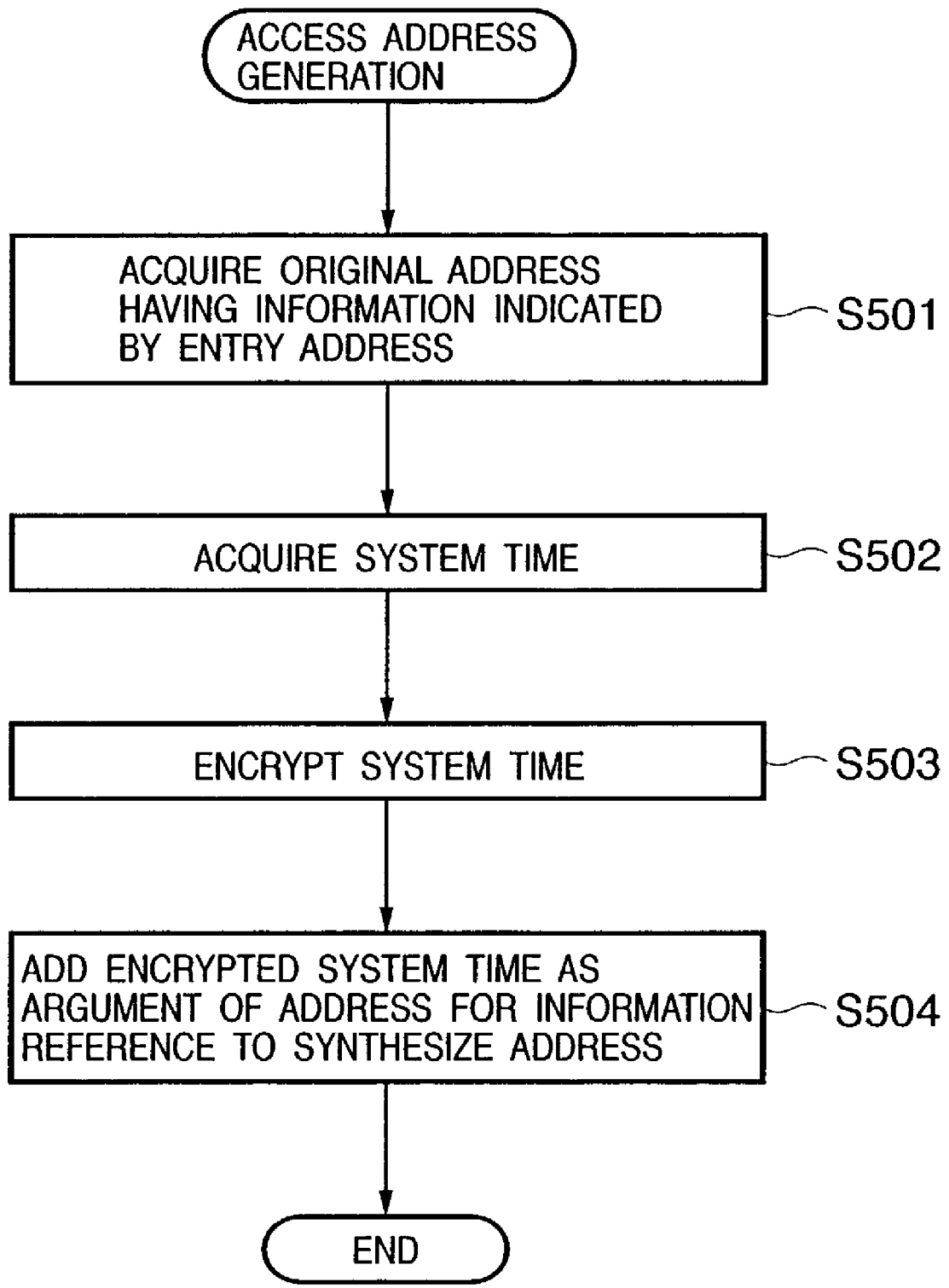
FIG. 6 is a flow chart for explaining access address generation processing in the information providing server according to the embodiment of the present invention.

FIG. 6 is a flow chart showing processing executed in F203 of FIG. 3 by the information providing server 103 according to the embodiment.

In step S501, the information providing server 103 acquires an original address corresponding to information indicated by the entry address for which the browser has transmitted an information reference request in F202. This address can be acquired by, e.g., looking up an address conversion table stored in the information providing server 103 in advance.

In step S502, system time is acquired by referring to an internal clock or a clock server on the information providing system.

In step S503, the system time acquired in step S502 is encrypted using a known encryption method. An arbitrary encryption method practicable in the information providing server 103 can be employed. The encryption method itself is not directly relevant to the present invention, and a detailed description thereof will be omitted.

In step S504, the information providing server 103 adds, as an argument, the encrypted system time generated in step S503 to the address acquired in step S501 to generate an access address.

(Address Determination Processing)

Figure 7:
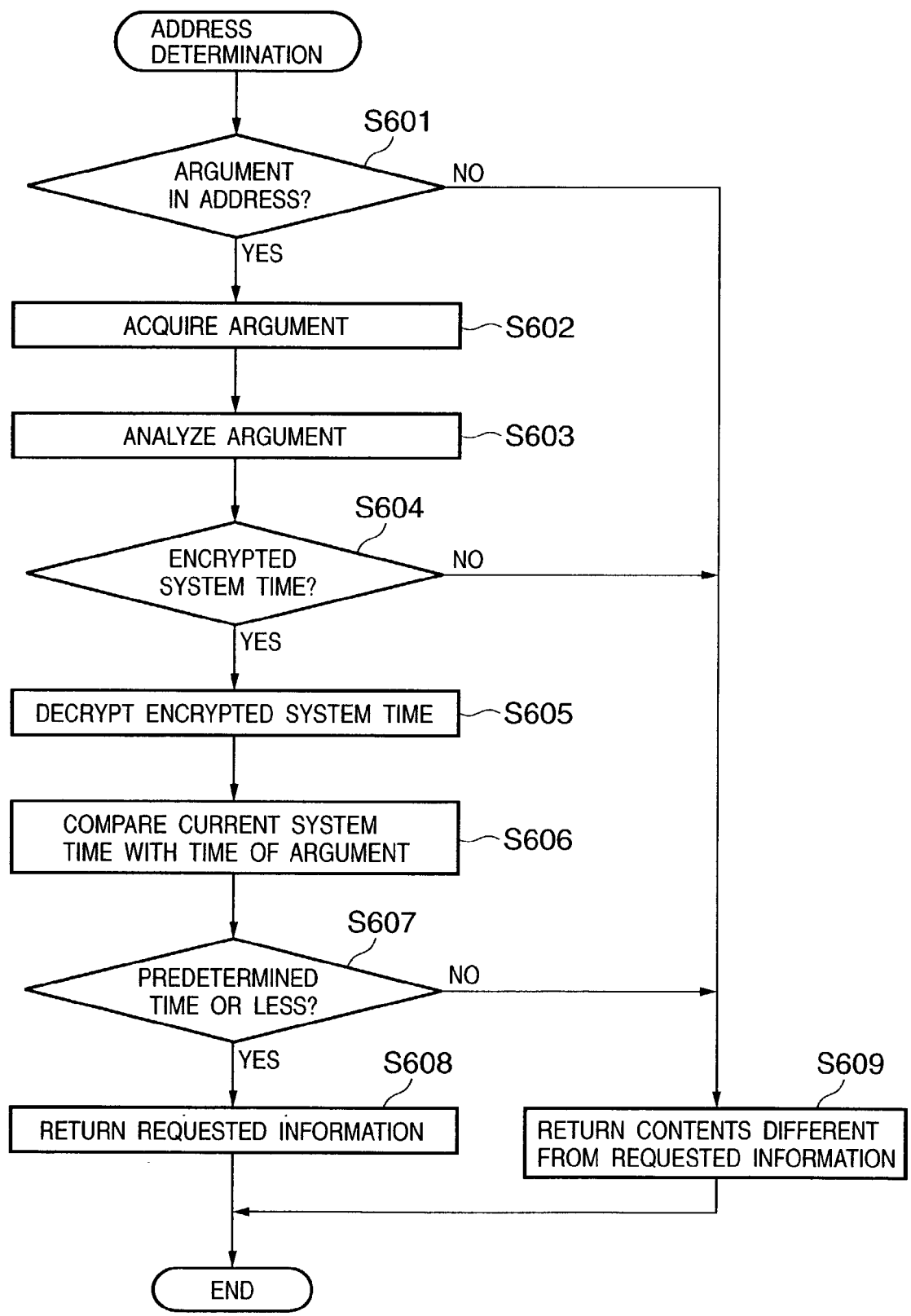
FIG. 7 is a flow chart for explaining address check processing in the information providing server according to the embodiment of the present invention.

FIG. 7 is a flow chart showing processing executed in F205 of FIG. 3 by the information providing server 103 according to the embodiment.

In step S601, it is determined whether the address for which the browser has transmitted an information reference request in F204 has an argument. If NO in step S601, the address is determined as invalid, and the flow advances to step S609.

If YES in step S601, the argument is acquired from the address in step S602.

In step S603, the argument acquired in step S602 is analyzed. It is determined in step S604 whether the argument is encrypted system time.

If YES in step S604, the flow advances to step S605. If NO in step S604, the address is determined as invalid, and the flow advances to step S609.

In step S605, the encrypted system time contained in the argument acquired in step S602 is decrypted.

In step S606, the current system time is acquired by referring to the internal clock or the clock server on the information providing system.

In step S607, the time contained in the address as the argument and decrypted in step S605 is compared with the system time acquired in step S606. If the different between the times has a predetermined value or less, the address is determined as valid, and the flow advances to step S608. Otherwise, the address is determined as invalid, and the flow advances to step S609.

The predetermined time used for this determination can arbitrarily be set. However, if the time is too long, an information reference request by direct address designation from a browser can hardly be eliminated. If too short, the user convenience decreases. Generally, since the former problem is more serious probably, the time should be several minutes at the best even in consideration of user convenience.

In step S608, the information providing server 103 determines that the information reference request from the user PC 101 is done in accordance with a proper procedure and transmits its initial window data to the browser.

On the other hand, if the address contains no argument, if the argument is contained but it is not encrypted system time, or when encrypted system time is contained in the argument but the difference between that time and the current system time exceeds a predetermined value, the reference request is determined for an invalid address. In step S609, the display data of an error notification window for a reference request without any proper procedure is transmitted to the browser as information other than the requested information.

(Processing for Information Reference Request without Proper Procedure)

For example, assume that the user sends an information reference request in accordance with a proper procedure and, when the initial window of the information providing server 103 is displayed in F206 of FIG. 3, the user registers in the browser address information displayed on the browser or records the information by any other means.

Also assume that in accessing the information providing server 103 later, the user sends an information reference request by directly designating the recorded address from the user PC 101B to the browser. In this case, processing executed in the information providing system corresponds to the processing from F204 in FIG. 3.

More specifically, in F204, the browser transmits to the information providing server 103 an information reference request indicated by the address designated by the user (the address recorded when the information was previously referred to in accordance with the proper procedure) through the Internet 102.

In F205, the information providing server 103 performs the address check processing described above with reference to FIG. 7. In this case, the information reference request transmitted in F204 contains encrypted system time as an argument. However, the address is determined as invalid by the time comparison processing in step S607. In F205, the data of the error notification window shown in FIG. 5 is returned to the browser.

In F206, the browser displays the error notification window.

In the above-described embodiment, when an information reference request is sent (from an entry address) in accordance with a proper procedure or not, the window shown in FIG. 4 or 5 is displayed on the browser. However, the present invention is not limited to this, and arbitrary information can be displayed in accordance with an entry address.

In the above embodiment, the system time is used as the criterion of the validity of an address. However, any other than the system time, e.g., a counter (system counter) from activation of the system may be used.

In the above embodiment, an entry address implemented in an application is used. However, when an entry address is used as a reference address of HTML or the like, the user can refer to information across a plurality of pages until he/she hits desired information.

This embodiment has exemplified only the case wherein the user PC 101 is used as a device (communication terminal) for accessing the information providing server 103. However, an arbitrary device having the same function as that of the user PC 101 in the above embodiment can be used. As such devices which are currently available, portable terminals such as a PDA and cell phone can be enumerated. The present invention is also based on the use of other devices which will undergo feature expansion or will be newly developed in the future.

The above embodiment has exemplified only the information providing server formed from one device. However, the same function as that of the server apparatus of the present invention may be implemented by a system constituted by a plurality of devices.

The present invention also incorporates a case wherein a software program for implementing the function of the above embodiment (a program corresponding to at least one of the flow charts of FIGS. 6 and 7 in the embodiment) is supplied to a system or apparatus having a computer capable of executing the program from a recording medium directly or by wire/wireless communication, and a similar function is implemented by making the computer of the system or apparatus execute the supplied program.

The program codes themselves which are supplied and installed in the computer to allow the computer to implement the function/processing of the present invention also realize the present invention. That is, the computer program itself, which implements the function/processing of the present invention, is also incorporated in the present invention.

In this case, the program may take any form, e.g., an object code, a program executed by an interpreter, and script data supplied to an OS, as long as it has the function of the program.

As a recording medium for supplying the program, a floppy disk, a hard disk, a magnetic recording medium such as a magnetic tape, an optical/magnetooptical storage medium such as an MO, a CD-ROM, a CD-R, CD-RW, DVD-ROM, DVD-R, or DVD-RW, a nonvolatile semiconductor memory, or the like can be used.

An example of the method of supplying the program by wire/wireless communication is a method of storing, in the server on the computer network, the computer program itself which implements the present invention or a data file (program data file) which can be a computer program for implementing the present invention in a client computer, e.g., a compressed file including an automatic installation function, and downloading the program data file to a connected client computer. In this case, the program data file can be divided into a plurality of segment files, and the segment files can be stored in different servers.

That is, the present invention incorporates a server apparatus which downloads the program data file for allowing a computer to implement the function/processing of the present invention to a plurality of users.

In addition, the following operation can be performed. The program of the present invention is encrypted and stored in a storage medium such as a CD-ROM. Such storage media are then distributed to users. A user who satisfies a predetermined condition is allowed to download key information for decryption from, for example, a home page through the Internet. The user executes the encrypted program by using the key information to make the computer install the program, thereby implementing the function/processing of the present invention.

The function of the above embodiment is realized not only when the readout program is executed by the computer but also when the OS or the like running on the computer performs part or all of actual processing on the basis of the instructions of the program.

The function of the above embodiment is also realized when the program read out from the storage medium is written in the memory of a function expansion board inserted into the computer or a function expansion unit connected to the computer, and the CPU of the function expansion board or function expansion unit or the like performs part or all of actual processing on the basis of the instructions of the program.

As has been described above, according to the present invention, direct information reference can be prevented by simple processing. Hence, the processing load on the information providing server can be reduced. In addition, information can be provided just as the information provider intends.

Furthermore, the present invention can be applied to the system comprising either a plurality of units or a single unit. It is needless to say that the present invention can be applied to the case which can be attained by supplying programs which execute the process defined by the present system of invention.

What is claimed is:

1. An information providing apparatus that provides an external terminal with multimedia information via a network, wherein said information providing apparatus includes a processor and a memory unit, comprising:
    a first acquiring unit that acquires a first current time, when a first request, which is based on a predetermined entry address information, is received from the external terminal;
    an encrypting unit that encrypts the first current time so as to generate an encrypted first current time;
    a generating unit that generates access information including address information of specific multimedia information corresponding to the predetermined entry address information and the encrypted first current time;
    a notifying unit that notifies the external terminal of the access information;
    a second acquiring unit that acquires a second current time, when a second request, which is based on the access information, is received from the external terminal;
    a determining unit that determines whether the encrypted first current time is included in the second request;
    a comparing unit that compares, if the determining unit determines that the encrypted first current time is included in the second request, a difference between the first current time obtained by decrypting the encrypted first current time and the second current time with a predetermined reference difference time; and
    a transmitting unit that transmits the specific multimedia information to the external terminal, if a comparison result by the comparing unit indicates that the difference between the first current time and the second current time is less than the predetermined reference difference time, and transmits information other than the specific multimedia information, if the comparison result by the comparing unit indicates that the difference between the first current time and the second current time is not less than the predetermined reference difference time.

2. The apparatus according to claim 1, wherein said network is the Internet and the information providing apparatus communicates with the external terminal according to Hyper-Text Transfer Protocol (HTTP).

3. A method for controlling an information providing apparatus that provides an external terminal with multimedia information via a network, comprising:
    a first acquiring step of the information providing apparatus acquiring a first current time, when a first request which is based on a predetermined entry address information, is received from the external terminal;
    an encrypting step of encrypting the first current time so as to generate an encrypted first current time;
    a generating step of the information providing apparatus generating access information including address information of specific multimedia information corresponding to the predetermined entry address information and the encrypted first current time;
    a notifying step of the information providing apparatus notifying the external terminal of the access information;
    a second acquiring step of the information providing apparatus acquiring a second current time, when a second request, which is based on the access information, is received from the external terminal;
    a determining step of determining whether the encrypted first current time is included in the second request;
    a comparing step of the information providing apparatus comparing, if the determining step determines that the encrypted first current time is included in the second request, a difference between the first current time obtained by decrypting the encrypted first current time and the second current time with a predetermined reference difference time; and
    a transmitting step of the information providing apparatus transmitting the specific multimedia information to the external terminal, if a comparison result by the comparing step indicates that the difference between the first current time and the second current time is less than the predetermined reference difference time, and transmitting information other than the specific multimedia information, if the comparison result by the comparing step indicates that the difference between the first current time and the second current time is not less than the predetermined reference difference time.

4. The method according to claim 3, wherein said network is the Internet and the information providing apparatus communicates with the external terminal according to HyperText Transfer Protocol (HTTP).

5. A computer readable storage medium on which is stored a computer executable program, the program for executing a method for controlling an information providing apparatus that provides an external terminal with multimedia information via a network, comprising:

a first acquiring step of the information providing apparatus acquiring a first current time, when a first request which is based on a predetermined entry address information, is received from the external terminal;

an encrypting step of encrypting the first current time so as to generate an encrypted first current time;

a generating step of the information providing apparatus generating access information including address information of specific multimedia information corresponding to the predetermined entry address information and the encrypted first current time;

a notifying step of the information providing apparatus notifying the external terminal of the access information;

a second acquiring step of the information providing apparatus acquiring a second current time, when a second request, which is based on the access information, is received from the external terminal;

a determining step of determining whether the encrypted first current time is included in the second request;

a comparing step of the information providing apparatus comparing, if the determining step determines that the encrypted first current time is included in the second request, a difference between the first current time obtained by decrypting the encrypted first current time and the second current time with a predetermined reference difference time; and a transmitting step of the information providing apparatus transmitting the specific multimedia information to the external terminal, if a comparison result of the comparing step indicates that the difference between the first current time and the second current time is less than the predetermined reference difference time, and transmitting information other than the specific multimedia information, if the comparison result by the comparing step indicates that the difference between the first current time and the second current time is not less than the predetermined reference difference time.

6. The computer readable storage medium according to claim 5, wherein said network is the Internet and the information providing apparatus communicates with the external terminal according to HyperText Transfer Protocol (HTTP).

7. An information providing system comprising an information providing apparatus and an external terminal connected via a network, wherein the information providing apparatus provides the external terminal with multimedia information via the network and wherein said information providing system includes a processor and a memory unit, the external terminal comprising:

a first transmitting unit that transmits a first request, which is based on a predetermined entry address information, to the information providing apparatus;

a receiving unit that receives an access information, which is sent by the information providing apparatus responsive to the first request, from the information providing apparatus; and a second transmitting unit that transmits a second request, which is based on the access information, to the information providing apparatus, and the information providing apparatus comprising:

a first acquiring unit that acquires, when the first request is received from the external terminal, a first current time;

an encrypting unit that encrypts the first current time so as to generate an encrypted first current time;

a generating unit that generates the access information by using the encrypted first current time and address information of specific multimedia information corresponding to the predetermined entry address information;

a third transmitting unit that transmits the access information the external terminal;

a second acquiring unit that acquires, when the second request is received from the external terminal, a second current time;

a determining unit that determines whether the encrypted first current time is included in the second request;

a comparing unit that compares, if the determining unit determines that the encrypted first current time is included in the second request, a difference between the first current time obtained by decrypting the encrypted first current time and the second current time with a predetermined reference difference time; and a fourth transmitting unit that transmits the specific multimedia information to the external terminal, if a comparison result by the comparing unit indicates that the difference between the first current time and the second current times is less than the predetermined reference difference time, and transmits information other than the specific multimedia information, if the comparison result by the comparing unit indicates that the difference between the first current time and the second current time is not less than the predetermined reference difference time.

* * * * *